United States Patent [19]
Oki

[11] Patent Number: 5,733,589
[45] Date of Patent: Mar. 31, 1998

[54] METHOD OF AND APPARATUS FOR DEVELOPING DOUGH

[75] Inventor: Yuzuru Oki, Kanagawa, Japan

[73] Assignee: Oshikiri Co., Ltd., Tokyo, Japan

[21] Appl. No.: 588,403

[22] Filed: Jan. 18, 1996

[30] Foreign Application Priority Data

Jan. 20, 1995 [JP] Japan .................... 7-025980

[51] Int. Cl.$^6$ ..................................... A21C 3/02
[52] U.S. Cl. .................. 425/364 R; 100/168; 425/367; 425/373; 425/363; 426/502
[58] Field of Search ................... 425/363, 367, 425/373, 364 R; 426/502; 100/168, 169, 170

[56] References Cited

U.S. PATENT DOCUMENTS

| | | | |
|---|---|---|---|
| 3,367,289 | 2/1968 | Bloemhof | 425/367 |
| 3,854,858 | 12/1974 | Bacher | 425/367 |
| 4,372,736 | 2/1983 | Gooch et al. | 425/367 |
| 4,880,375 | 11/1989 | Hayashi | 425/367 |
| 4,957,426 | 9/1990 | Hayashi | 425/367 |
| 5,079,014 | 1/1992 | Morikawa et al. | 426/502 |
| 5,106,636 | 4/1992 | Ban et al. | 426/502 |
| 5,209,939 | 5/1993 | Kempf | 426/502 |

FOREIGN PATENT DOCUMENTS

WO07756  4/1993  WIPO .................. 425/367

*Primary Examiner*—Khanh P. Nguyen
*Attorney, Agent, or Firm*—Flynn, Thiel, Boutell & Tanis, P.C.

[57] ABSTRACT

A method of and an apparatus for developing dough capable of developing dough uniformly and effectively. In the method for developing dough based on difference in surface velocity between a pair of upper and lower rollers disposed upstream and another pair of upper and lower rollers disposed downstream, it is characterized in that the upper roller disposed upstream moves vertically and reciprocally to beat the dough. In the apparatus for developing dough comprising a pair of upper and lower rollers disposed upstream and another pair of upper and lower rollers disposed downstream, it is characterized in that the upper roller disposed upstream is vertically movable so as to beat dough. Dough is effectively and uniformly developed without displacing the upper and lower layers so that the stress inside dough is dispersed and gas is effectively let out of dough.

5 Claims, 5 Drawing Sheets

METHOD OF AND APPARATUS FOR DEVELOPING DOUGH

BACKGROUND OF THE INVENTION

1. Field of the Invention

The present invention relates to a method of and an apparatus for developing dough, particularly to a method of and an apparatus for effectively and uniformly developing bread dough.

2. Prior Art

As our eating habits diversify and our individuality develops, the many various kinds of foodstuffs increase.

Bread is a mainstream foodstuff among those many foodstuffs and is very popular with the younger generation.

However, needs for taste are developed highly, particularly, high quality and improvement of productivity are always needed for buns.

Meanwhile, an external appearance and quality of dough subtly affects the taste, luster and chewing of the buns.

Since many buns use developed dough, a process of developing dough is very important.

Further, since the process of developing dough largely affects the quality of buns, there have been carried out many technical developments in apparatus and methods for developing dough.

For example, one of the apparatuses for developing dough is proposed as disclosed in JP-B 3-17459, wherein planetary rollers are disposed so as to be self-propelled and revolve along an endless track over a plurality of conveyors which are arranged in series.

Another apparatus is proposed as disclosed in JP-B 5-65130, wherein a plurality of conveyors, each having a different velocity, are arranged in series, and a plurality of freely rotatable rollers are provided over the plurality of conveyors and are arranged in series wherein the rollers reciprocally move along carrying surfaces of the conveyors so as to develop dough.

In the apparatus as disclosed in JP-B 3-17459, the planetary rollers move endlessly, and in the apparatus as disclosed in JP-B 5-65130, the rollers reciprocally move in a moving direction of the dough.

In any case, the rollers move in a direction from carrying direction of dough to develop dough, which easily generates displacement between upper and lower layers of dough. Considering an object to achieve the uniform developing effect, these apparatus are not sufficient.

SUMMARY OF THE INVENTION

The present invention has been made in view of the aforementioned problems. It is therefore an object of the present invention to provide a method of and an apparatus for developing dough capable of developing dough uniformly and effectively.

The inventor of the present application aims the operation of the developing rollers for solving the aforementioned problems and studied diligently. As a result, the inventor of the present application has found that dough could be very effectively developed when developing a roller beaten or kneaded dough based on which the invention is completed.

That is, it is a first aspect of the present invention to provide a method for developing dough based on the difference in surface velocity between a pair of upper and lower rollers disposed upstream and another pair of upper and lower rollers disposed downstream, wherein it is characterized in that the upper roller disposed upstream moves to beat or knead the dough.

It is a second aspect of the invention to provide a method for developing dough based on the difference in surface velocity between a pair of upper and lower rollers disposed upstream and a pair of upper and lower rollers disposed downstream, wherein it is characterized in that the upper roller disposed upstream move vertically reciprocally relative to the dough to beat the dough.

It is a third aspect of the invention to provide a method wherein the upper roller disposed upstream of the second aspect of the invention can be controlled to change frequency of beating or kneading.

It is a fourth aspect of the invention to provide a dough developing apparatus comprising a pair of upper and lower rollers disposed upstream and another pair of upper and lower rollers disposed downstream wherein the upper roller disposed upstream is vertically movable so as to beat or knead dough perpendicularly relative to the dough.

It is a fifth aspect of the invention to provide a dough developing apparatus characterized by further comprising an auxiliary roller disposed between the pair of upper and lower rollers disposed upstream and those disposed downstream in the fourth aspect of the invention.

It is a sixth aspect of the invention to provide a dough developing apparatus characterized by further comprising an auxiliary belt body disposed between the pair of upper and lower rollers disposed upstream and those disposed downstream in the fourth aspect of the invention.

It is a seventh aspect of the invention to provide a dough developing apparatus characterized in that the lower roller of the pair of upper and lower rollers disposed upstream in the fourth aspect of the invention comprises a belt body.

It is an eighth aspect of the invention to provide a dough developing apparatus characterized by further comprising a means composed of a link mechanism for vertically moving the upper roller of the pair of upper and lower rollers disposed upstream in the fourth aspect of the invention.

With the arrangements of the present invention set forth above, dough can be developed based on difference in surface velocity, described later, between a pair of rollers disposed upstream for moving dough and those disposed downstream for receiving dough.

Since the upper roller of the pair of rollers disposed upstream beats or kneads a surface of dough, the surface receives strong pressing force vertically, and hence it is crushed and is then pushed between the upper and lower rollers, finally it is developed effectively and uniformly.

PREFERRED EMBODIMENT OF THE INVENTION

First Embodiment (FIGS. 1 through 4)

The developing apparatus generally comprises a pair of upper and lower rollers R1 and R2 disposed upstream and another pair of upper and lower rollers R3 and R4 disposed downstream, which has been conventionally employed.

Figure 7:
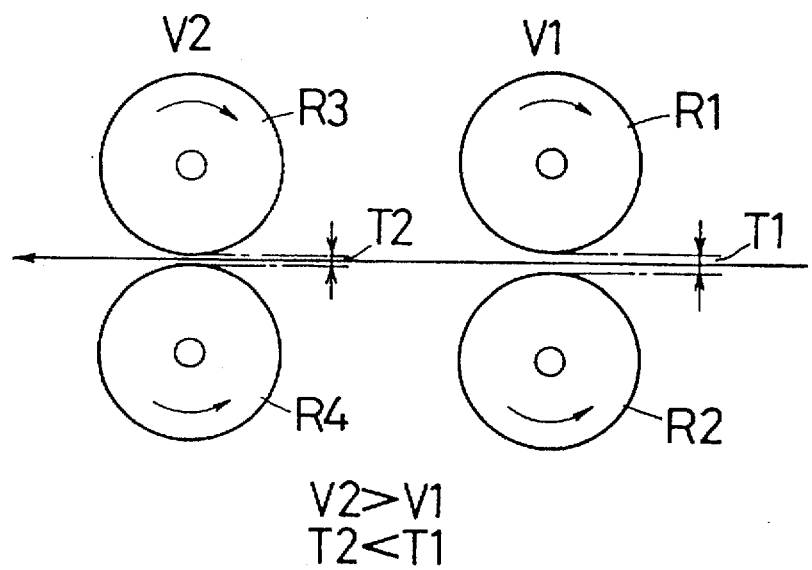
FIG. 7 is a view showing a principle of a prior art developing apparatus.

An interval T1 between the pair of upper and lower rollers R1 and R2 disposed upstream is greater than an interval T2 between the pair of upper and lower rollers R3 and R4 disposed downstream (T1>T2). Velocity of the pair of upper and lower rollers R3 and R4 at a position where they contact dough tangentially, namely, they contact at right angles (hereinafter referred to as surface velocity) is greater than that of the pair of upper and lower rollers R1 and R2 (V1<V2). Based on difference in surface velocity, dough which was carried or transferred between those rollers is developed (refer to FIG. 7).

The developing apparatus of the present invention is different from the prior art developing apparatus in respect of motions of the upper roller R1 of the pair of upper and lower rollers R1 and R2, namely, in respect of the vertical motion or operation of the upper roller R1.

Figure 1:
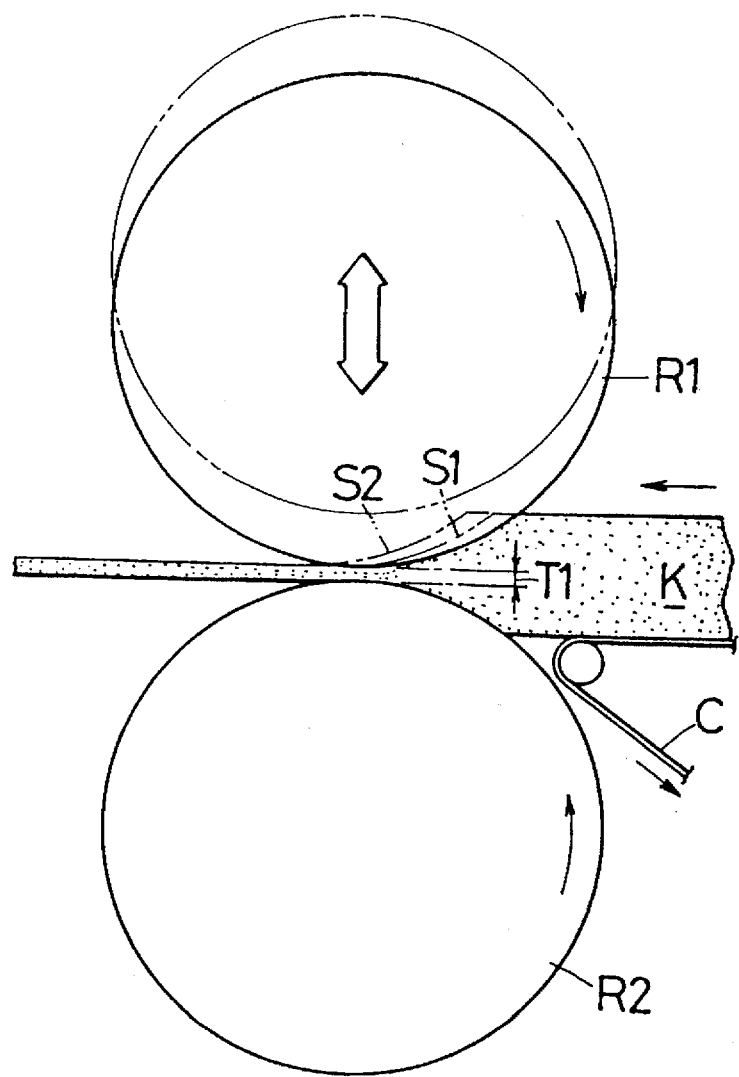
FIG. 1 is a view fundamentally showing a method of developing dough.

FIG. 1 fundamentally shows a developing method of the present invention wherein the pair of upper and lower rollers R1 and R2 are enlarged.

In the prior art developing apparatus, the pair of upper and lower rollers R1 and R2 are disposed to rotate while they remain defining an interval T therebetween. However, in the developing apparatus of the present invention, the upper roller R1 moves vertically.

In FIG. 1, the upper roller R1 remains to define a given interval T1 relative to the lower roller R2 even in the lowest point thereof.

A cycle or frequency of the vertical motion of the upper roller R1 is a couple of times per second, e.g., concretely, about three times per second.

In such a cycle, a carrying velocity of dough supplied from a conveyor C is normally less than one centimeter per second, and the upper roller R1 beats a surface of dough about one time during the time when the dough is moved by several millimeters.

Dough is passed and carded through the pair of upper and lower rollers R1 and R2, and hence thickness of dough is reduced.

Viewing the motion of the upper roller R1, when the upper roller R1 is positioned at the highest position as represented by the broken line (FIGS. 1–3), it lowers in a very short time (substantially instantaneously) so as to beat the surface of dough.

After the upper roller R1 reaches the lowest position as represented by the solid line, it rises in a very short time (substantially instantaneously), and is then returns to the highest position as represented by the broken line. Since the upper roller R1 repeats such motions, the dough is beaten by the surface of the upper roller R1 so as to repeat the operations in the manner of applying pressing force concentrically to the surface of dough.

Motion of the upper roller R1 will now be observed with motion of dough.

When the upper roller R1 rises to the highest position as shown in the broken line instantaneously from a state where it reaches the lowest position represented by the solid line, dough is advanced and supplied from the position represented by the solid line to the position represented by the broken line in the moving direction of dough during the vertical motion of the upper roller R1 (a part of dough which is advanced and supplied to a position is denoted by S1).

The upper roller R1 lowers and returns from the highest position represented by the broken line to the lowest position represented by the solid line during a very short time (substantially instantaneously).

Even in such a very short time when the upper roller R1 lowers, although dough might be further advanced and supplied from the position represented by the broken line to a position represented by the chain line in the moving direction of dough (a part of dough is advanced and supplied to a position denoted by $2), since the upper roller R1 has lowered almost instantaneously to the lowest position represented by the solid line, so that the parts denoted by $1 and $2 are beaten and crushed during the lowering operation of the upper roller R1.

On the other hand, since the upper roller R1 continues to rotate, the beaten and crushed dough is pushed between the upper and lower rollers R1 and R2 during the rotation of the rollers. Since such operations are continuously and repeatedly carried out, pressing force is applied to dough by the pair of upper and lower rollers R1 and R2 disposed upstream as if a steamed rice were being pounded with a mallet.

In other words, when a steamed rice is pounded with a mallet after putting the steamed rice dough into a mortar having a hemispherical inner bottom, the steamed rice dough is crushed and is pushed into the hemispherical inner bottom of the mortar while it is beaten. The dough is effectively developed while it is crushed and pushed into the hemispherical inner bottom while it is beaten by the mallet.

According to the present invention, the same operations are repeated, namely, dough is crushed while it is beaten by the upper roller R1, then it is pushed between the pair of upper and lower rollers R1 and R2 by the rotation of the upper roller R1. That is, dough is repeatedly crushed and pushed by the upper roller R1.

The dough is not displaced at the upper and lower portions thereof by such crushing and pushing operations of the upper roller R1, and hence stress inside dough is dispersed and balanced so that dough can be uniformly developed. When dough is subjected to such crushing and pushing operations intermittently, gas is effectively let out of dough. Accordingly, the developing efficiency of dough may be enhanced.

Figure 2:
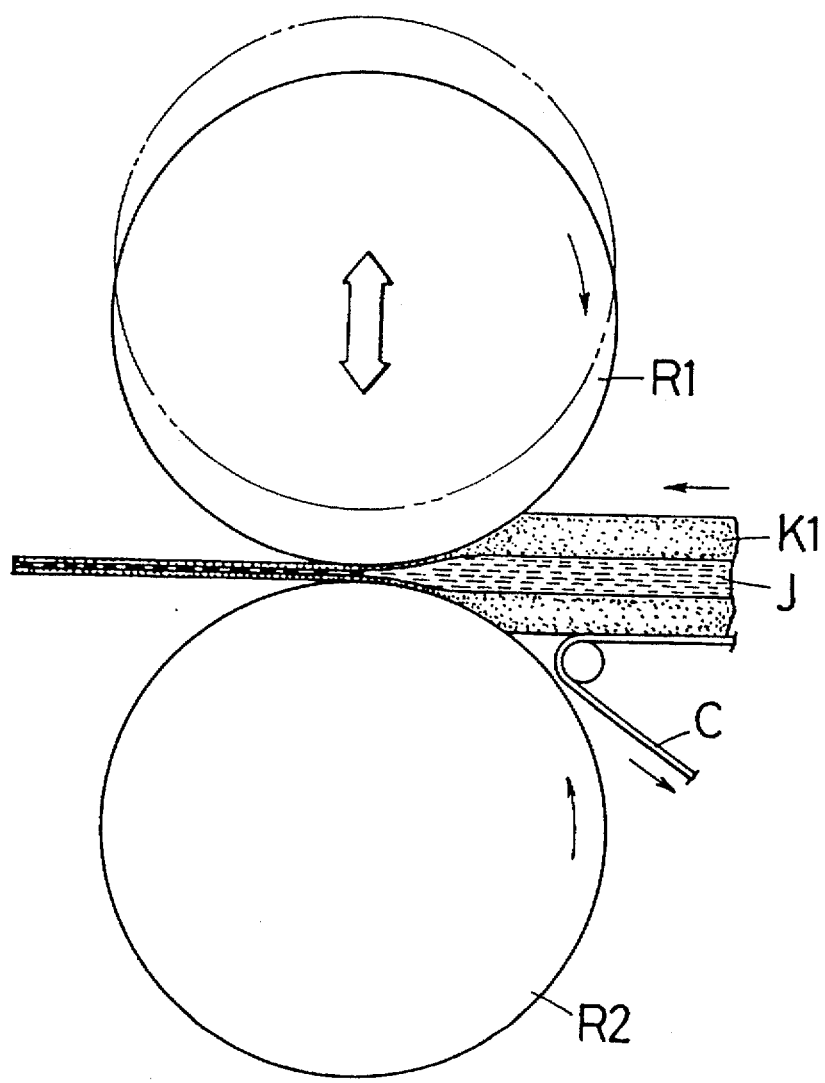
FIG. 2 is a view fundamentally showing a method of developing dough in which an oil and fat layer is inserted.

FIG. 2 fundamentally shows a developing method like FIG. 1. Although dough in FIG. 1 has nothing inside thereof, dough K1 in FIG. 2 has an oil and fat layer (hereinafter referred to as fat layer) J sandwiched therein.

Meanwhile, if a multilayer dough of a bun is composed of dough and a fat layer is tasted, when it is baked, the layers are separated from each other so as to give a peculiar taste, which has been very popular to the younger generation.

The multilayer dough is prepared by developing a dough K1 sandwiching a laminar fat layer J therein. Dough is repeatedly developed and folded. When dough is developed and folded several times, dough having a very thin multilayer, e.g., composed of several (ten) layers is prepared.

In the case of employment of the developing method of the present invention, when dough is developed while sandwiching the fat layer J therein, the upper roller R1 can beat the laminar fat layer J, even if the fat layer J is relatively hard, and hence the fat layer J can be integrally developed with dough without generating any displacement between the layers.

Further, an inner stress which has acted locally so far between the fat layer J, ingredient of which is different from dough, and dough is canceled so that the inner stress is evenly dispersed so that the dough and the fat layer J remain in a balanced state.

Whereupon, since the upper roller R1 periodically beats dough perpendicularly relative to dough, the vertical motion of the upper roller R1 must be repeatedly performed.

As mentioned above, the vertical motion of the upper roller R1 is performed several times per second, as if the surface of dough were beaten.

Figure 3:
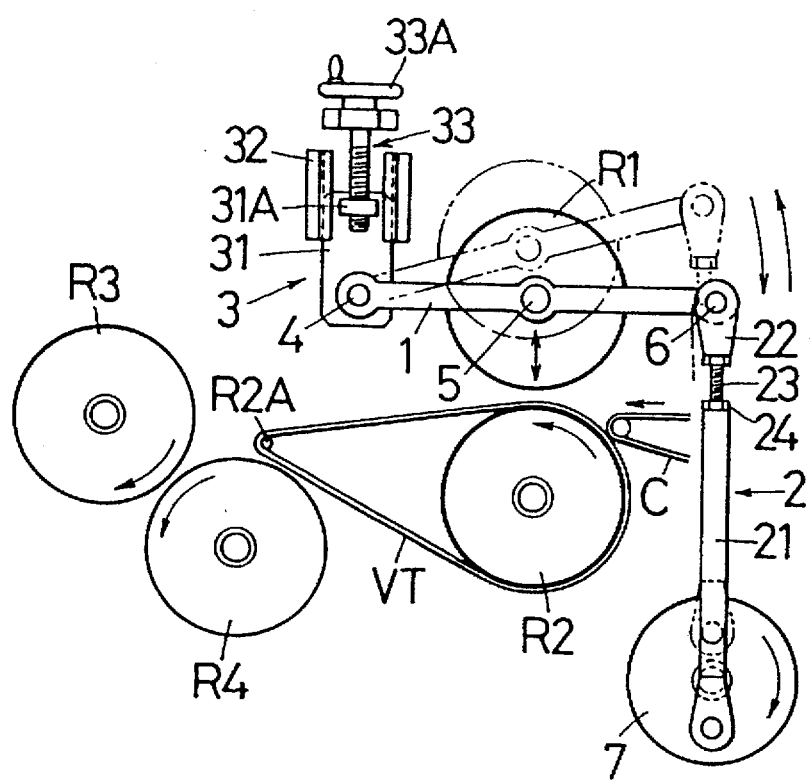
FIG. 3 is a view showing a developing apparatus wherein a belt is entrained around a lower roller of a pair of upper and lower rollers disposed upstream.

As a means for performing such a vertical motion, for example, a mechanism shown in FIG. 3 is employed.

FIG. 3 shows a developing apparatus comprising a pair of upper and lower rollers R1 and R2 provided with a belt body VT, and another pair of upper and lower rollers R3 and R4. In FIG. 3, a belt body VT is entrained around the lower roller R2 and another roller R2A with a rotational axis adjacent and parallel to the lower roller R4.

A center of the upper roller R1 is rotatably positioned at the middle of a first link 1 while a tip end of the first link 1 is pivotally coupled to a regulator 3 by way of a first pivot 4. The other end of the first link 1 is pivotally coupled to an end of a second link 2 by way of a second pivot 6.

The other end of the second link 2 is pivotally, eccentrically coupled to a rotary drive body 7 which is rotated by a driving source, not shown. The second link 2 is divided into a long link 21 and a short link 22, namely, it comprises the long link 21, the short link 22 and a screw shaft 23 interposed between the long link 21 and the short link 22.

Accordingly, an interval between the long link 21 and short link 22 can be regulated by screwing a nut 24, so that a length of the second link 2 can be changed. When the rotary body 7 rotates, the second link 2 performs a vertical and reciprocal motion, so that the first link 1 pivotally coupled to the second link 2 performs a reciprocal motion about the first pivot 4.

The upper roller R1 having its axis on the first link member 1 can perform substantially the vertical linear motion by sufficiently lengthening the first link 1.

Whereupon, the regulator 3 regulates a position of the first pivot 4, and hence it regulates the interval between the pair of upper and lower rollers R1 and R2. The regulator 3 comprises a moving plate 31 which moves vertically, a guide rail 32 for guiding the moving plate 31, and a regulating screw 33.

Since the regulating screw 33 is inserted into and slidably fixed to a female screw member 31A constituting a part of the moving plate 31, when a handle 33A is turned, the regulating screw 33 is turned and a screw portion of the regulating screw 33 is screwed into the female screw member 31A of the moving plate 31 so that the moving plate 31 rises.

When the moving plate 31 rises, the first pivot 4 of the first link member 1 also rises. When the first pivot 4 moves upward, a rotary center 5 of the upper roller R1 rises so that the interval between the pair of upper and lower rollers R1 and R2 is increased by a rising distance of the rotary center 5.

When the handle 33A is turned counterclockwise, the regulating screw 33 is also turned counterclockwise so that the screw portion of the regulating screw 33 is loosened from the female screw 31A of the moving plate 31, and hence the moving plate 31 lowers. When the moving plate 31 lowers, the first pivot 4 of the first link 1 also lowers.

When the first pivot 4 moves downward, the rotary center 5 lowers, so that the interval between the pair of upper and lower rollers R1 and R2 is reduced by a lowering length of the rotary center 5.

In such a manner, degree or frequency of beating by the upper roller R1 relative to dough can be changed by the regulator 3.

Figure 4:
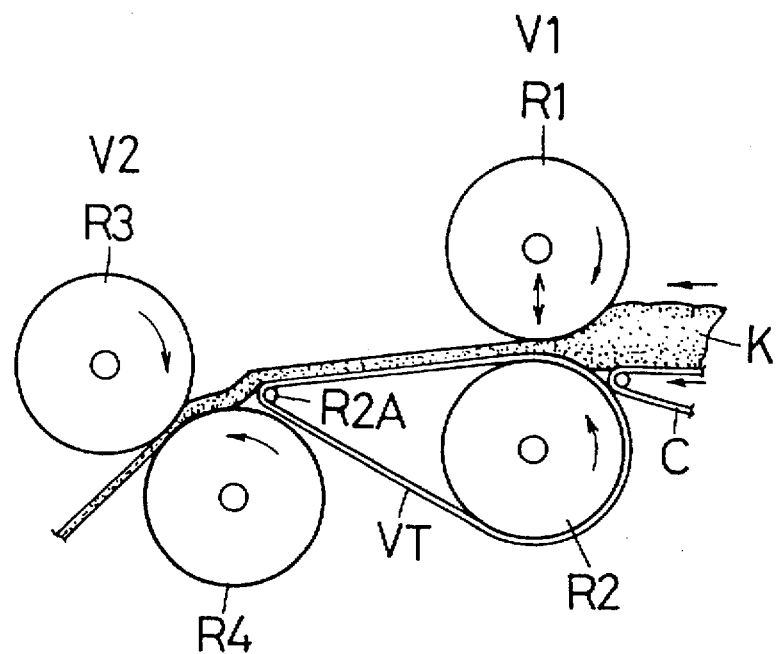
FIG. 4 is a view showing a state where dough is developed by the apparatus in FIG. 3.

FIG. 4 is a view showing a state where dough which is developed by the apparatus in FIG. 3.

Supposing that surface velocity of the pair of upper and lower rollers R1 and R2 is V1 and that of the pair of upper and lower rollers R3 and R4 is V2, an expression of V1<V2 is established.

Figure 5:
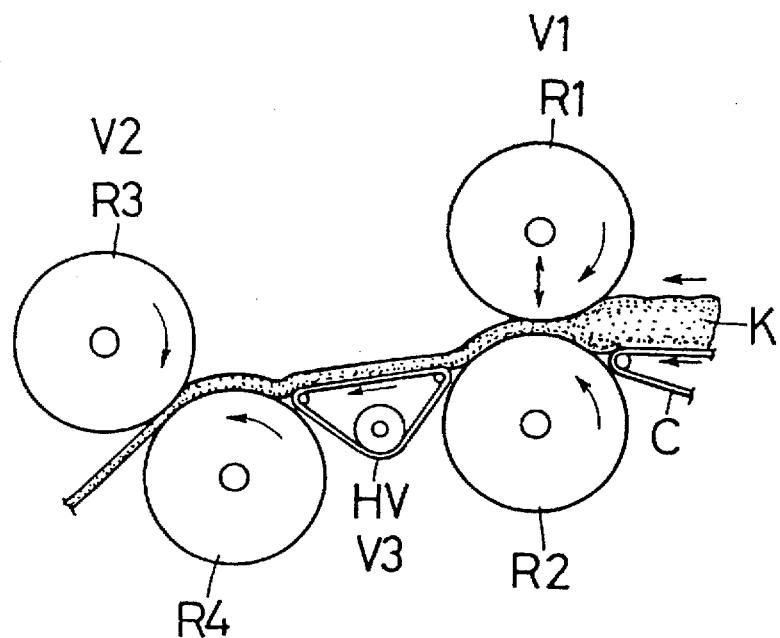
FIG. 5 shows a developing apparatus according to a second embodiment of the present invention.

Second Embodiment (FIG. 5)

A developing apparatus according to a second embodiment of the invention will be now described with reference to FIG. 5.

The developing apparatus comprises a pair of upper and lower rollers R1 and R2 disposed upstream, a pair of upper and lower rollers R3 and R4 disposed downstream, and a belt body HV disposed between the pairs of upper and lower rollers R1, R2 and R3, R4. In FIG. 5, the belt body HV is disposed between the lower rollers R2 and R4 and comprises a roller and a belt entrained around this roller between the lower rollers R2 and R4.

Supposing that the surface velocity of the pair of upper and lower rollers R1 and R2 is V1, and that of the pair of upper and lower rollers R3 and R4 is V2, and that of the belt body HV is V3, normally either of an expression of (a) V1<V2, V2=V3 or an expression of (b) V1<V3<V2 is established.

In case of (b), a relatively large developing ratio can be obtained.

Figure 6:
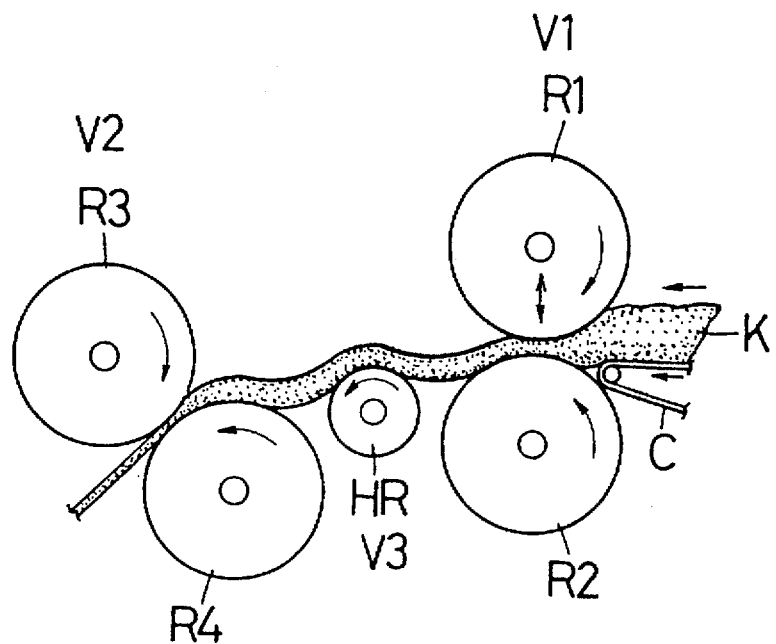
FIG. 6 shows a developing apparatus according to a third embodiment of the present invention.

Third Embodiment (FIG. 6)

A developing apparatus according to a third embodiment will be now described with reference to FIG. 6.

The developing apparatus comprises a pair of upper and lower rollers R1 and R2 disposed upstream, a pair of upper and lower rollers R3 and R4 disposed downstream, and a belt body HR disposed between the pairs of upper and lower rollers R1, R2 and R3, R4. In FIG. 6, the belt body HR is disposed between the lower rollers R2 and R4.

Supposing that the surface velocity of the pair of upper and lower rollers R1 and R2 is V1, that of the pair of upper and lower rollers R3 and R4 is V2, and that of the belt body HR is V3, normally either of an expression of (a) V1<V2, V2=V3 or an expression of (b) V1<V3<V2 is established, like the second embodiment as shown in FIG. 5.

In case of (b), a relatively large developing ratio can be obtained like the second embodiment.

The operation to develop dough will be now described.

The dough is first supplied from a conveyor C and is then passed or transferred between the pair of upper and lower rollers R1 and R2.

The upper roller R1 performs the vertical and reciprocal motion so as to beat a dough K so that the dough K is beaten by a peripheral surface of the upper roller R1. The dough K is beaten by the peripheral surface of the upper roller R1 immediately after it is passed between the upper and lower rollers R1 and R2, and the beating operation is repeated.

When the dough K is subjected to such frequent beating operation, it is kneaded as if a steamed rice were pounded with a mallet. In such a manner, a continuous dough can be effectively kneaded and developed.

Although the present invention is explained with reference to the first through third embodiments, it is not limited to these embodiments but includes various modifications without departing from the essence or scope of the present invention for realizing the objects of the present invention.

For example, although the present invention employs a link mechanism for moving the upper roller vertically and reciprocally, the vertical and reciprocal motion of the upper roller R1 may be directly interlocked with the operation of a piston when the piston is employed instead of the link mechanism and it is coupled to a shaft of the upper roller R1. A minute regulation of the interval between the upper and lower rollers may be performed by directly moving the rotary center of the upper roller.

It is needless to say that an auxiliary roller or an auxiliary belt body may be appropriately employed so as to smoothly move dough in addition to the upper and lower rollers.

Dough is effectively and uniformly developed by merely operating the upper roller disposed upstream. Further, dough can be uniformly developed without displacing the upper and lower portions or layers so as to disperse the stress inside dough. Gas is effectively let out of dough when dough is repeatedly beaten.

In the prior art developing method, the thickness of dough can not be largely reduced, but according to the present invention, it can be largely reduced, which enhances the developing efficiency.

What is claimed is:

1. A dough developing apparatus comprising a pair of upstream upper and lower rollers, a supply conveyor for receiving dough thereon and conveying the dough to the pair of rollers, a pair of downstream rollers, the rotation speed of the upstream rollers being greater than that of the supply conveyor and the rotational speed of the downstream rollers being greater than that of the upstream rollers, and means for raising and lowering the upstream upper roller several times per second at a constant frequency to knead the dough while positively rotating the upstream upper roller, wherein the means for raising and lowering the upstream upper roller comprises a link mechanism, said link mechanism comprising a first pivot means which can be adjustably raised or lowered, a first link having a first end supported by said first pivot means and a second end pivotably attached to a second link, said upstream roller being rotatably attached to the first link, and means for raising and lowering the second link in a reciprocating fashion.

2. A dough developing apparatus according to claim 1, wherein an auxiliary conveyor is provided between the upstream rollers and the downstream rollers.

3. A dough developing apparatus according to claim 1, wherein an auxiliary roller is provided between the upstream rollers and the downstream rollers.

4. A dough developing apparatus according to claim 1, wherein the lower roller of the upstream rollers has a conveyor belt provided thereon.

5. A dough developing apparatus according to claim 1, wherein the means for raising and lowering the upstream upper roller comprises a link mechanism.

* * * * *